Feb. 25, 1958 R. C. WRIGHT, JR 2,824,569
PNEUMATIC SEQUENTIAL SELECTORS
Filed May 28, 1956
6 Sheets-Sheet 1

INVENTOR:
ROBERT C. WRIGHT, JR.
by
Atty.

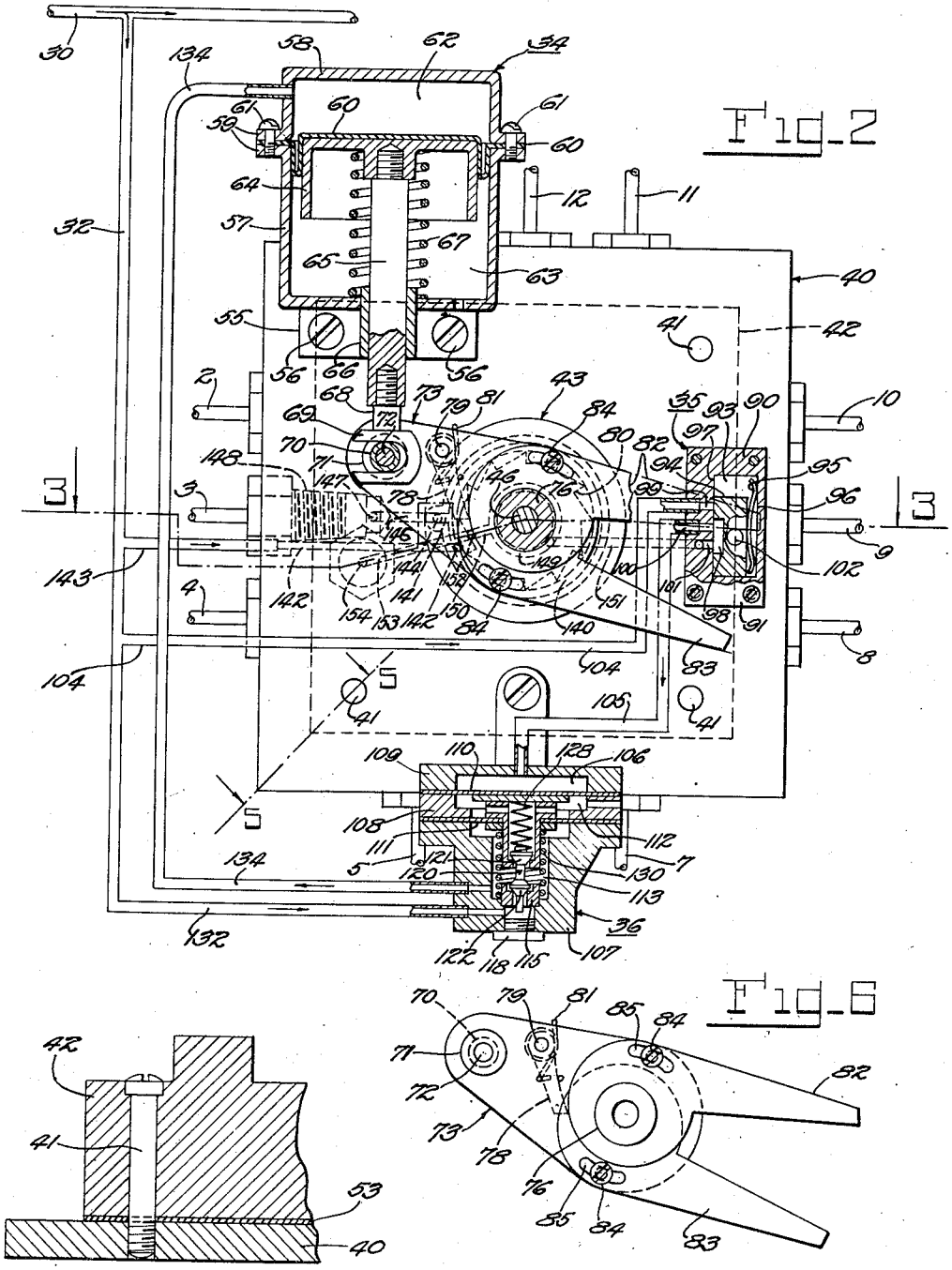

Feb. 25, 1958
R. C. WRIGHT, JR
2,824,569
PNEUMATIC SEQUENTIAL SELECTORS
Filed May 28, 1956
6 Sheets-Sheet 3
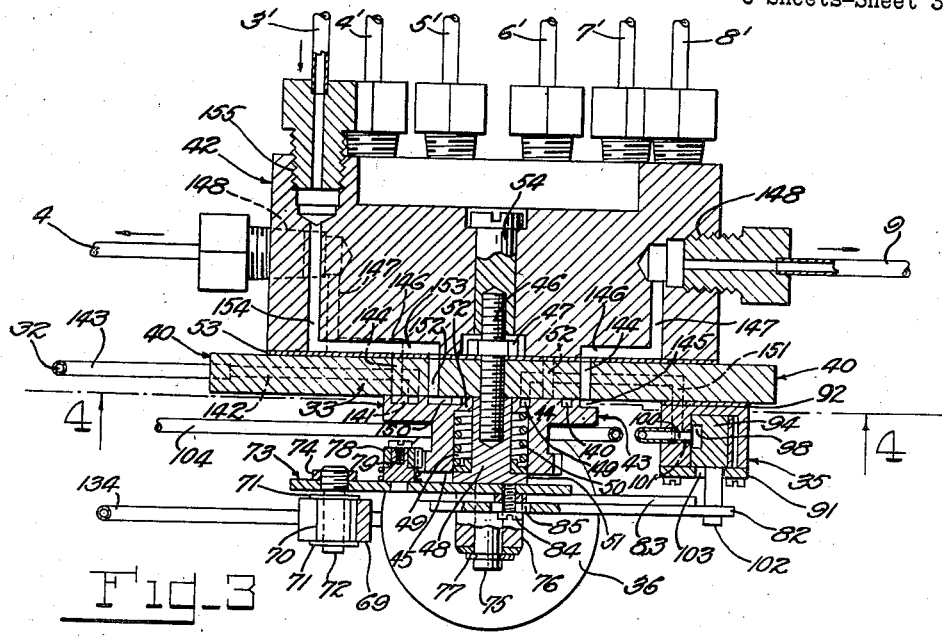
Fig_3
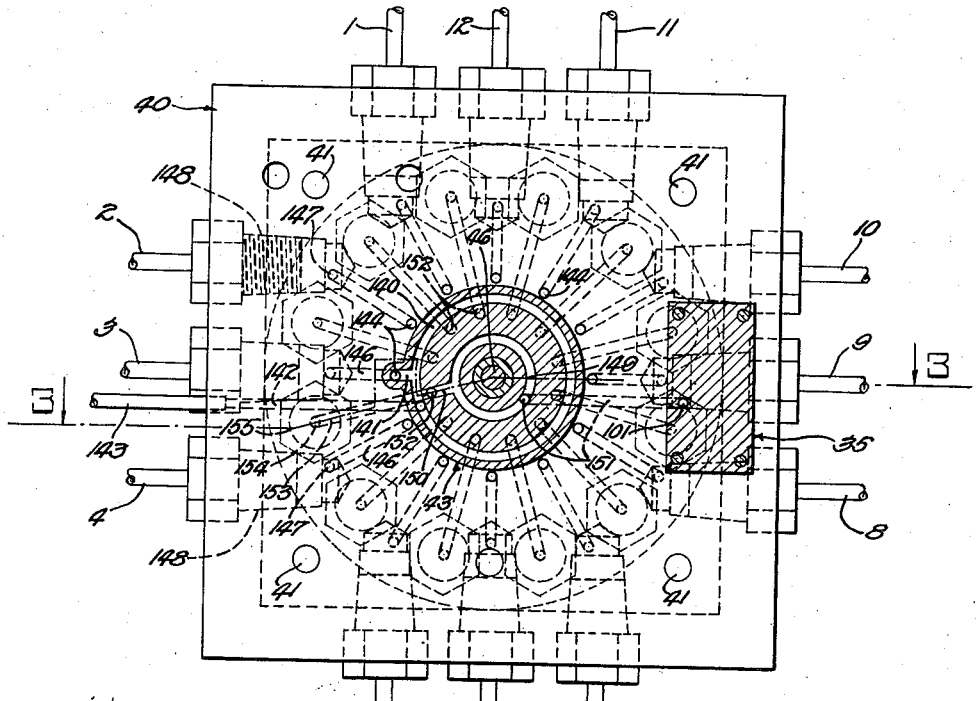
Fig_4
INVENTOR:
ROBERT C. WRIGHT, JR.
by
Atty.

Feb. 25, 1958
R. C. WRIGHT, JR
2,824,569
PNEUMATIC SEQUENTIAL SELECTORS
Filed May 28, 1956
6 Sheets-Sheet 4
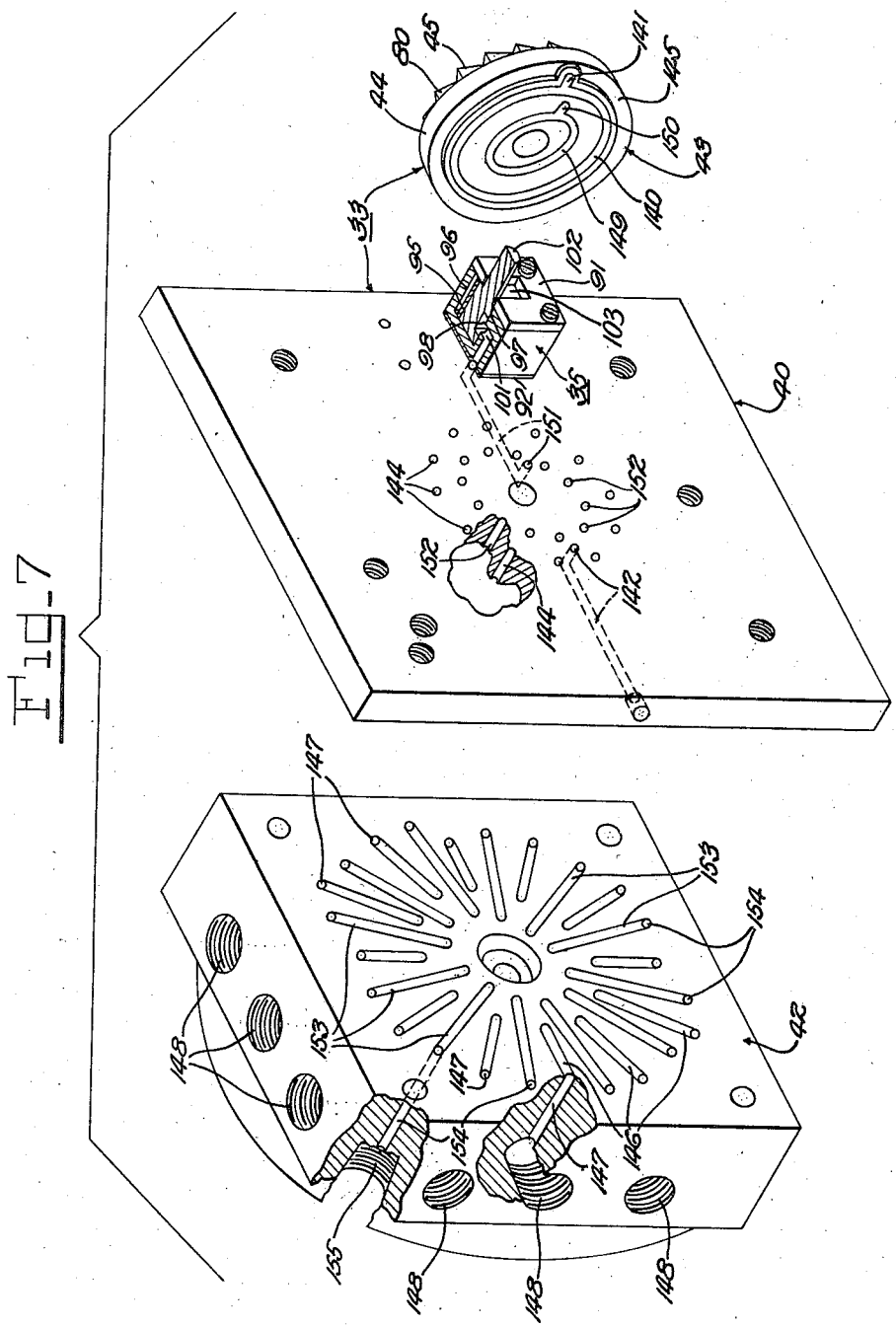
INVENTOR:
ROBERT C. WRIGHT, JR.
by  
Atty Feb. 25, 1958 R. C. WRIGHT, JR 2,824,569
PNEUMATIC SEQUENTIAL SELECTORS
Filed May 28, 1956 6 Sheets-Sheet 5
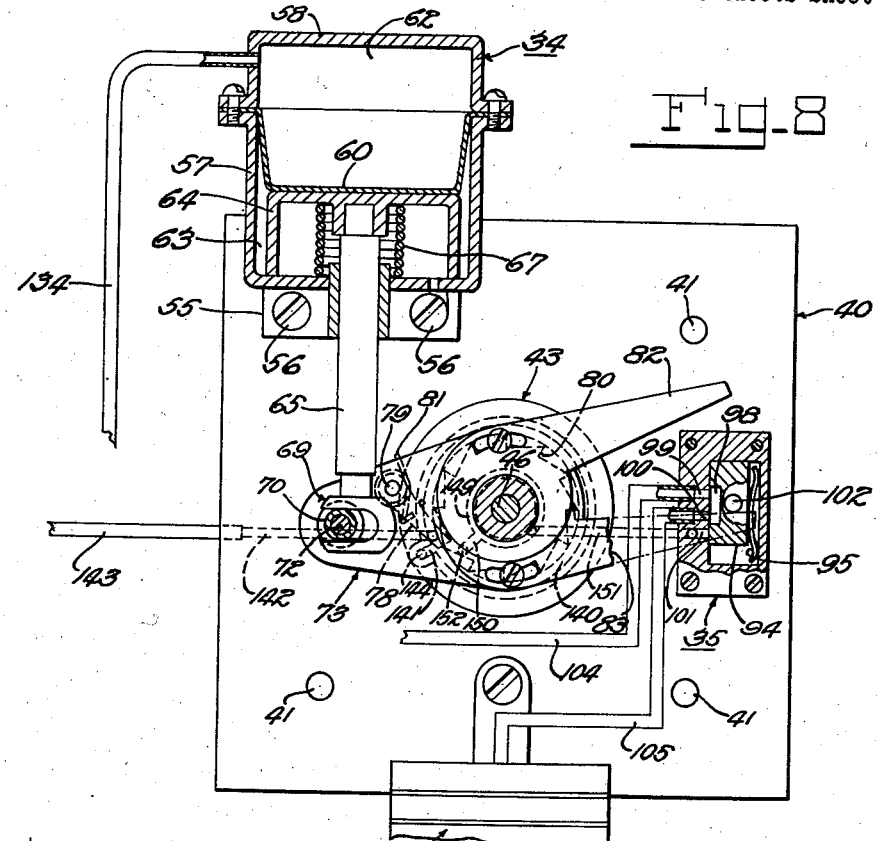
INVENTOR:
ROBERT C. WRIGHT, JR.

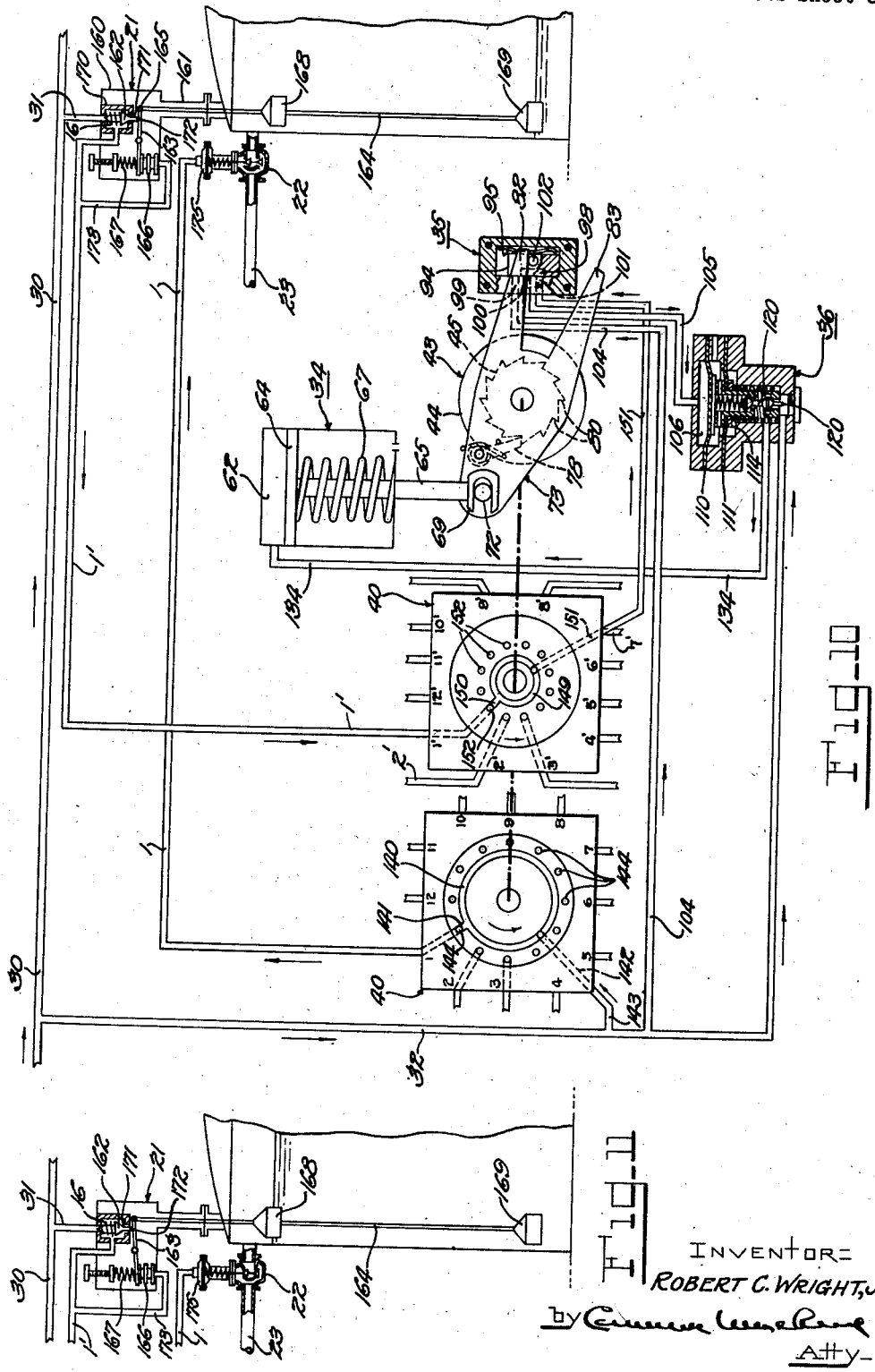

United States Patent Office

2,824,569
Patented Feb. 25, 1958

2,824,569

PNEUMATIC SEQUENTIAL SELECTORS

Robert C. Wright, Jr., Hingham, Mass., assignor to Worthington Corporation, New York, N. Y., a corporation of Delaware Application May 28, 1956, Serial No. 587,611

7 Claims. (Cl. 137—122)

This invention relates to a device which provides automatic sequential switching of a plurality of pneumatic signals in response to independent pneumatic initiating signals. One specific application in which the invention may be utilized, as herein illustrated, is sequentially governing the filling of a battery of storage tanks as may be frequently encountered in the petroleum industry. It will be understood however that the device embodying this invention may be applied to any process wherein fluid of any kind is stored in, or delivered from, a plurality of vessels. It also may be utilized to sequentially scan a plurality of incoming signals to provide an appropriate alarm or control action when an abnormal signal is encountered.

The device generally includes a dual mutipoint selector valve comprising a rotatable element which operates against a fixed element, whereby a common fluid passage may be connected to any one of several other passages, the particular passage to which it is connected being determined by the angular position of the rotatable element. It also includes means for providing a step by step rotation of said element through the application of pulsating pneumatic pressure, together with mechanism for supplying the pulsating pneumatic pressure in response to an appropriate incoming signal which in turn is provided by an external measuring device. The incoming signal may either initiate or terminate pressure pulsations and thereby the actuation of the selector valves, depending on the magnitude of the in coming signal. One portion of the selector valve, hereinafter referred to as the input portion, functions to determine the source of the incoming signal from one of the plurality of measuring devices, and the other, hereinafter referred to as the output portion, functions to determine the destination of an output signal to a control element associated with the corresponding measuring device.

As herein shown and described, the device embodying this invention is applied to control the filling of a battery of liquid storage tanks by sequentially sampling the pressure signals from the level transmitters associated with the tanks, and dwelling at the first station at which the incoming signal indicates that the tank is empty. During the dwell period, an output pressure signal is transmitted to a liquid supply valve at the tank station from which the input signal is received. When the tank is filled, an input signal from the level transmitter showing that the tank is full will cause sequential sampling to be resumed until an incoming signal denoting an empty tank is encountered, whereupon the filling procedure is repeated.

In general the sequential selector comprises a dual multiport selector valve, means for advancing the dual multiport selector valve in a step by step manner by application of a pulsating pneumatic pressure, and means for generating pressure pulses when a selected value of signal pressure is encountered. One part of the dual multiport selector valve is arranged to select the source of input signal, and the other part directs the output control pressure to the corresponding destination. The selector valve will dwell on one set of ports as long as the input signal is of the appropriate value, but will advance when the input signal changes until a source of appropriate input signal is encountered.

It is an object of this invention to provide means for sequentially scanning a plurality of incoming pressure signals and to dwell on any appropriate incoming signal while a suitable output signal is transmitted to an appropriate control element.

Other objects of this invention will be more fully understood from the following description when taken in connection with the accompanying drawings, in which:

Fig. 2 is a front elevation, partly in section, of the selector unit of the control mechanism;

Fig. 3 is a horizontal section taken substantially on the line 3—3 of Figs. 2 and 4, there being minor deviations to show additional details of certain parts;

Fig. 4 is a vertical section taken on the line 4—4 of Fig. 3;

Fig. 5 is a section taken on the line 5—5 of Fig. 2;

Fig. 6 is a detailed view of the forked lever assembly of Fig. 2;

Fig. 7 is a perspective view of certain elements of the selector unit shown separated;

Fig. 8 is a view of the selector unit similar to Fig. 2 but showing certain of its parts differently positioned;

Fig. 9 shows an alternate arrangement of the slide valve connections;

Fig. 10 is a schematic view to illustrate the operation of the device;

Fig. 11 is a view of a portion of Fig. 10 showing a tank filled and the automatic operation of the level transmitter unit to shut off the tank supply;

Fig. 12 is an enlarged view of the relay pilot shown in Fig. 10; and

Fig. 13 is a similar view of the relay pilot with the parts shown in a different relation from that shown in Fig. 12.

Figure 1:
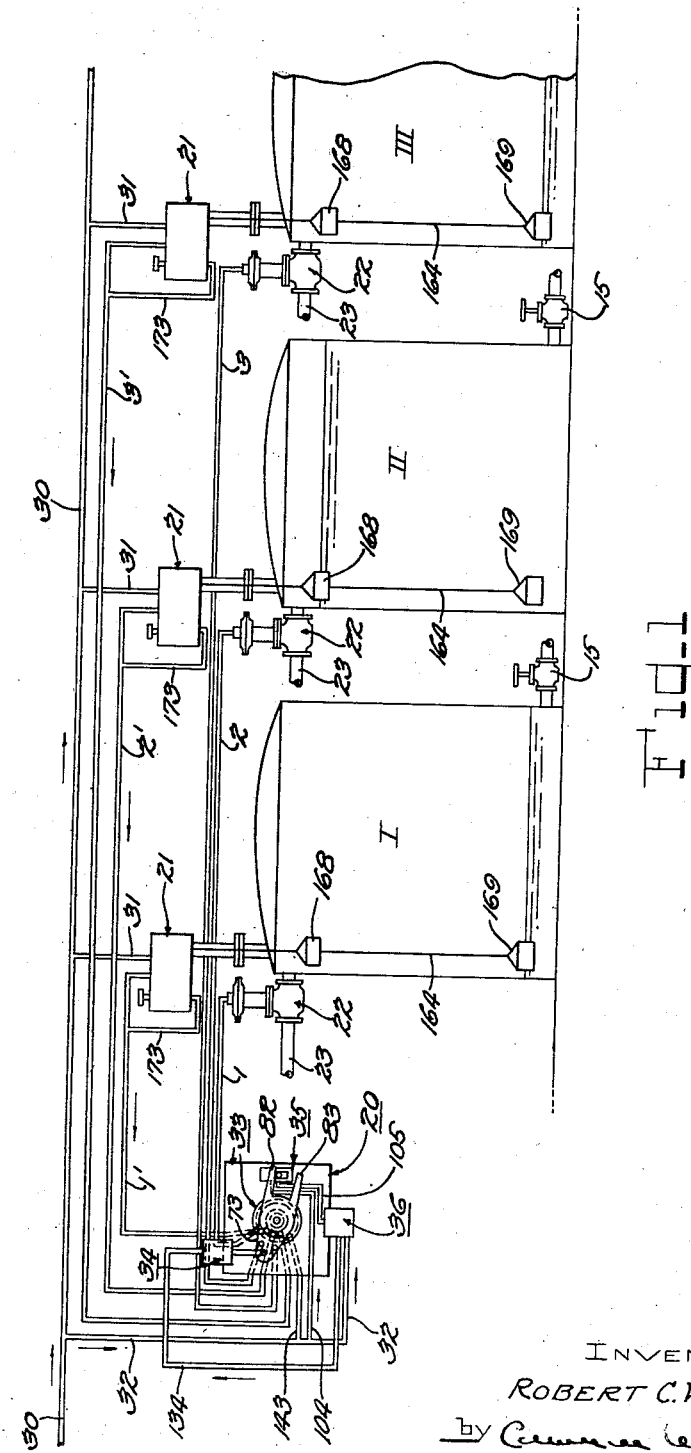
Fig. 1 shows, partly in diagram, three of a series of tanks equipped with automatically operated refill control mechanism embodying the present invention.

Having reference to Fig. 1, there is shown a sequential selector, generally indicated at 20, as applied to a battery of storage tanks of which partial illustration is shown by tank stations I, II and III. Each tank is provided with a level transmitter 21, to be more fully described, with a fill valve 22 for governing the flow of liquid to the tank through a pipe 23 from a source not shown, and with a draw-off valve 15. The fill valves 22 are adapted to open on an increase in control pressure and to close on a decrease in pressure. Each tank with its associated level transmitter and fill valve constitutes one station of the storage tank battery, the object being to fill in sequence tanks which have been emptied and to by-pass those tanks which are not empty. The transmitted signal from each level transmitter 21 is connected with the sequential selector 20 by pipes $1^1$, $2^1$ and $3^1$, and the actuating signal to each fill valve 22 is supplied from the sequential selector by pipes 1, 2 and 3. Pneumatic supply pressure from a source not shown is connected to each level transmitter 21 through pipes 30 and 31 and is also connected with the sequential selector 20 through the pipe 30 and a pipe 32. The sequential selector 20, now to be described, scans the tank battery in sequence, and when an empty tank is encountered, receives a high pressure signal from the transmitter 21 associated with that station, opens the fill valve 22, and dwells on that station until the tank is filled whereupon a low pressure signal is transmitted by the level transmitter and scanning is resumed until the next empty tank is encountered.

The sequential selector 20 comprises a dual multiport selector valve generally indicated at 33, shown in detail in Figs. 2, 3, 4 and 7, pneumatic means for operating the selector valve in the form of an actuator 34 which imparts a step by step rotation to the selector valve by means more fully to be described, means for generating pressure pulses to the actuator, as dictated by the received signal, in the form of a slide valve, generally indicated at 35, and a pilot relay, generally indicated at 36.

Referring to Figs. 3, 4, and 7, the dual multiport selector valve 33 consists of a valve plate 40 secured by cap screws 41, see also Figs. 2 and 5, to a manifold block 42, the parts being mounted in a suitable housing not shown, and also consists of a rotor 43. The rotor 43 is generally in the form of a spool comprising a selector portion 44 and a ratchet portion 45. A double-ended stud 46 (see particularly Fig. 3) is provided with a hex collar 47 and is threaded through the plate 40. A spindle 48, mounted in the bore 49 of the rotor 43, is in threaded engagement with the lower end of the stud 46 and is thereby secured to the plate 40. A helical spring 50 is confined between a head 51 on the spindle 48 and an inwardly extending flange 52 on the selector portion 44 of the rotor 43 to maintain a resilient sealing force between the rotor and the plate 40. A gasket 53 is disposed between the plate 40, the manifold block 42, the collar 47 and the stud 46, and the sealing pressure for the gasket is provided by the cap screws 41 and an internally threaded cap screw 54 which engagegs the upper end of the double ended stud 46. Thus the rotor 43 may be rotated against the plate 40 by means now to be described.

Means for rotating the rotor 43 against the plate 40 (see Fig. 2) consists of the actuator 34 which includes a casing connected in any well-known manner, not shown, to a supporting bracket 55 secured to the plate 40 by cap screws 56. The casing comprising a lower housing 57 and an upper housing 58, the parts being suitably flanged at 59 and secured together with a diaphragm 60 therebetween by cap screws 61. The diaphragm 60 divides the casing into a pressure chamber 62 and a spring chamber 63, the latter including a piston 64 of inverted cup shape having secured thereto, as by threading, a stem 65 which extends through a guide bushing 66 and is surrounded by a helical spring 67, disposed between the bottom of the lower portion 57 of the casing and the piston 64, to provide a resilient force in opposition to the force generated by operating pressure in the chamber 62. The lower end of the stem 65 has threaded thereto a shank 68 which is preferably integral with a yoke 69. The yoke 69 spans a spool 70 having retaining flanges 71 which engage the sides of the yoke. As is also shown in Fig. 3, a pin 72 makes a sliding fit through the center of the spool 70 which also slidably engages the yoke 69. The other end of the pin 72 may be rigidly fastened to a ratchet arm 73, as by threading, and a suitable lock nut 74, the ratchet arm 73 being rotatably mounted on a shaft 75 which is preferably integral with the spindle 48. For this purpose the ratchet arm 73 has secured thereto, by means not shown, a bearing hub 76 which is adapted to rotate about the shaft 75 and is retained in axial position by means of a snap ring 77 adapted to be received within an annular groove adjacent the end of the shaft. A pawl 78 is pivotally mounted at 79 on the ratchet arm 73 and is adapted to coact with ratchet teeth 80 disposed about the circumference of the ratchet portion 45 of the selector valve rotor, the pawl being urged against the ratchet teeth by a suitable spring 81. Also attached to the ratchet arm 73 is a slide valve actuator comprising arms 82 and 83 which are rotatably mounted on the hub 76 and are adjustably secured to the ratchet arm 73 by screws 84 which extend through radially disposed slots 85 in the actuator arms and are threaded into the ratchet arm (see Figs. 2, 3 and 6). By this means independent angular adjustment between the ratchet arm 73 and the arms 82 and 83 of the slide valve actuator may be effected.

Having reference to Figs. 2, 3, 7 and 8, the slide valve 35 may consist of a casing in the form of a block 90 provided with a cover plate 91, the parts being secured to the selector valve plate 40 with a gasket 92 therebetween (see Fig. 3). The casing block 90 is provided with a rectangular recess 93 in which a movable valve block 94 is disposed. A flat spring 95 between one side of the movable block 94 and a wall 96 of the recess 93 maintains a resilient force to hold the opposite side of the movable block against the corresponding wall 97 of the recess. A recess 98 in the movable block 94 is adapted to cooperate with three ports, 99, 100 and 101, disposed in the wall 97 of the recess. The ports 99, 100 and 101 are equidistantly located along a line parallel to the motion of the movable block 94. The recess 98 in the movable block 94 is arranged to connect the center port 100 with either but not both of the ports 99 and 101, depending upon the position of the movable block. A pin 102 is secured to the movable block 94 and extends through a slot 103 in the cover plate 91 for engagement with either of the actuating arms 82 and 83.

The upper port 99 of the slide valve 35 (see Fig. 2) connects with the supply pipe 32 by means of a pipe 104. The center port 100 of the slide valve 35 is in operative connection with the pilot 36 by means of a pipe 105 which communicates with the pilot control chamber 106. The pilot 36 is of the reverse snap-acting type more fully shown and described in my application for United States Letters Patent, Serial Number 533,711, dated September 12, 1955. Referring to Figs. 2, 12 and 13, the pilot comprises a body 107, an intermediate plate 108, and a cover 109. Secured between the intermediate plate 108 and the cover 109 is a flexible upper diaphragm 110 of a selected effective area, and between the intermediate plate and the body 107 a flexible lower diaphragm 111 is disposed having a selected area less than that of the upper diaphragm. The diaphragms 110 and 111 serve to divide a central cavity in the pilot assembly into three chambers, namely, the control pressure chamber 106, an exhaust chamber 112 and an output pressure chamber 113, and also serve to locate an exhaust valve assembly generally indicated at 114. At the lower end of the output pressure chamber 113 a supply valve seat 115 is mounted having an orifice 116 which connects the chamber 113 with a supply pressure chamber 117, the lower end of the supply pressure chamber, as herein shown, being closed by a threaded plug 118. The exhaust valve assembly 114 includes a spacer 119 of T shape in cross section and a double valve member 120 having an exhaust valve 121 at its upper end and a supply valve 122 at its lower end. The spacer comprises a head 123 and a tubular depending portion 124 which extends through the lower diaphragm 111, the spacer being clamped to the lower diaphragm against the head 123 by a washer 125. A diaphragm plate 126, secured to the spacer head 123, engages the upper diaphragm 110. The lower end of the tubular portion 124 is flanged inwardly to provide an exhaust seat 127 with which the exhaust valve 121 cooperates, the supply valve 122 being adapted to cooperate with the supply seat 115. A helical spring 128, within a spring chamber 129 in the spacer 119, is disposed between the diaphragm plate 126 and the double valve 120 and provides a downward thrust tending to close the valves. A second helical spring 130 is confined between the bottom of the output pressure chamber 113 and the exhaust valve assembly 114 to develop a thrust in opposition to the force generated by fluid pressure in the control chamber 106. The supply chamber 117 is provided with a port 131 which connects with the fluid pressure supply in the pipe 32 by means of a pipe 132. The output pressure chamber 113 has a port connection 133 with a pipe 134 which communicates with the pressure chamber 62 in the actuator 34. The spring chamber 129 in the exhaust valve assembly 114 is connected with atmosphere through ports 135 in the head 123 of the spacer 119, the exhaust chamber 112, and a port 136 in the intermediate plate 108.

In operation, when the pilot 36 receives a selected high pressure signal from the slide valve 35 in the control chamber 106, the downward force on the diaphragm 110 is sufficient to overcome the upward force from the spring 130 and the pressure acting on the lower diaphragm 111, whereby the supply valve 122 is closed and the exhaust valve 121 starts to open. As the pressure in the output pressure chamber 113 decreases, the reduction in upward force provided by the lower diaphragm 111 permits the exhaust valve assembly 114 to move downward fully opening the exhaust valve 121 and immediately reduces the output pressure to zero p. s. i. When a selected low pressure signal is received in chamber 106, the spring 130 forces the exhaust valve assembly 114 upward closing the exhaust valve 121, and starts to open the supply valve 122. The resulting build-up of output pressure acting against the lower diaphragm 111 opens the supply valve wide resulting in an immediate increase in output pressure to that of the supply pressure. The position of the parts for a high pressure signal and zero p. s. i. pressure output is shown in Fig. 12, and the position shown in Fig. 13 is that for a low pressure signal and an output pressure equal to supply. In this way a mode of operation referred to as reverse snap action is achieved.

Referring again to the dual selector valve 33 and particularly Figs. 3, 4 and 7, and to the schematic view shown in Fig. 10, the output portion of the dual selector valve includes a circular groove 140 in the face of the rotor 43 having a radial extension groove 141 connecting therewith. The circular groove 140 is in communication with a common port 142 disposed in the valve plate 40, which port connects with the supply pressure pipe 32 by means of a pipe 143. The radial extension 141 of the circular groove 140 connects with any one of a series of output pipes, herein shown as numbered 1-12, depending upon the angular position of the rotor 43, through any one of a ring of ports 144. The remaining ports 144 are open to atmosphere through a cutaway portion 145 (see particularly Figs. 3 and 7) which, except for the land enclosing the radial extension groove 141, extends around the circumference of the rotor. The ports 144 extend through the plate 40 and communicate with a series of radial grooves 146 (Figs. 3, 4 and 7) in the mating surface of the manifold block 42. The radial grooves 146 in the manifold block 42 communicate through ports 147 with pipe connections 148 to which the pipes 1-12 are threaded. Each of the pipes 1-12 connects with a fill valve 22 (see Fig. 1) at a tank station of which Nos. I, II and III herein shown are representative.

The signal input portion of the dual selector valve includes a circular groove 149 on the face of the rotor 43 having a radial extension groove 150 connecting therewith. The circular groove 149 is in communication with a common port 151 in the valve plate 40, which port connects with the lower port 101 of the slide valve 35 (see Figs. 4, 7 and 10). The radial extension 150 of the circular groove 149 connects with any one of a series of input signal pipes, numbered $1^1-12^1$, depending on the angular position of the rotor 43, through a ring of ports 152 extending through the plate 40 and communicating with a series of radial grooves 153 in the mating surface of the manifold block 42. The radial grooves 153 in turn communicate through ports 154 with pipe connections 155 to which the pipes $1^1-12^1$ are threaded. Each of the pipes $1^1-12^1$ connects with a level transmitter 21 at a tank station. The three ports 99, 100 and 101 in the slide valve connect with the supply pressure through the pipe 104, with the control chamber 106 of the pilot relay through the pipe 105, and with the common port 151 of the input portion of the selector valve, respectively.

The function of the pneumatic sequential selector may be described as follows:

Let it be assumed that the input portion of the selector valve is connected with a high pressure signal, for example, from the pipe $1^1$. The high pressure signal is communicated to the control pressure chamber 106 in the pilot relay 36 through pipe $1^1$ and its associated port 152 as illustrated in Fig. 10, radial extension groove 150, circular groove 149, common port 151, slide valve ports 101, and 100, and pipe 105. The high pressure in the control chamber 106 of the relay maintains a pilot output pressure of zero p. s. i. in the actuator pressure chamber 62 which is connected with the pilot output through the pipe 134. As long as a high pressure signal exists, the dual selector valve remains stationary and supply pressure is transmitted from the pipe 143, common port 142 in the plate 40, circular groove 140, and radial extension groove 141 in the rotor 43, port 144 in the plate 40, radial groove 146, port 147 and pipe connection 148 in the manifold block 42, to the output pipe. When the high pressure signal changes to a low pressure signal, the resulting low pressure in the pilot control chamber 106 causes the pilot output pressure to increase to that of the supply pressure which, when applied to the pressure chamber 62 of the actuator 34, forces the piston 64 down against the spring 67, rotates the ratchet arm 73 counterclockwise, and by means of the pawl 78 and ratchet teeth 80 on the selector valve rotor 43, advances the rotor to the next position, whereby the radial extension grooves 150 and 141 are connected with ports 152 and 144 associated with pipes $2^1$ and 2, respectively. The port 144 associated with output pipe 1 is now open to atmosphere and the pressure in pipe 1 is reduced to zero p. s. i. When the ratchet arm 73 approaches the end of its counterclockwise movement, the slide valve actuator arm 83 engages the pin 102 and moves the slide valve block 94 to the position shown in Fig. 8.

The slide valve block 94 now being in the position shown in Fig. 8, the control chamber 106 of the pilot receives supply pressure through the pipe 104 and the ports 99 and 100 in the slide valve. Since the control chamber 106 of the pilot is loaded with supply pressure, the pilot output is exhausted to zero p. s. i. and the actuator piston 64 is returned by the spring 67 to its original position as shown in Figs. 2 and 10. As the piston approaches the end of its travel, the slide valve actuator arm 82 engages the pin 102, and returns the slide valve to its original position, also shown in Figs. 2 and 10. The control chamber 106 of the pilot is again connected to the common port 151 of the signal input portion of the selector valve which is now in communication with the signal input pipe $2^1$. If the input signal in pipe $2^1$ is zero p. s. i., the stepwise advance is immediately repeated, but if the input signal in the pipe $2^1$ is a high pressure signal, the output of the pilot 36 is maintained at zero p. s. i. and the selector dwells at that position as long as the high pressure signal is maintained.

It will be understood from the above that the selector will advance in stepwise fashion until a high pressure signal is encountered and will dwell at that position as long as the high pressure signal is maintained, during which time supply pressure is transmitted to the correponding output pipe.

In the typical application illustrated in Figs. 1 and 10, the level transmitter may be of any well-known type, and as herein illustrated (see Figs. 10 and 11) comprises a housing 160 mounted on a supporting pipe 161 connected with the top of the storage tank, and includes a supply and waste valve 162, actuated in one direction by a lever 163 having a fixed pivot, and in the opposite direction by a spring 16. The lever 163 is actuated by a displacer rod 164, to which it is pivoted at one end 165, and by a bellows 166 which engages the opposite end of the lever and is opposed by an adjustable spring 167. The float rod 164 is operated by two displacers 168 and 169 spaced apart on the float rod a distance equal to the desired change in level of the tank contents. The supply and waste valve 162 is mounted in a casing 170 and is connected with the supply pipe 30 by means of the pipe 31 and with the atmosphere through a bleed port 171 which surrounds a valve stem 172 in operative connection with the lever 163. When the supply and waste valve 162 is lowered to the position shown in Fig. 10, supply pressure is connected with the input signal pipe $1^1$ through the pressure chamber in the casing 170. When the supply and waste valve is raised to the position shown in Fig. 11, the supply is shut off, and the pressure in the signal pipe is exhausted to atmosphere through the bleed port 171. The bellows 166 communicates with the input signal pipe through a pipe 173. The lever 163 is subjected to four forces, namely, the weight of the displacers 168 and 169, the force developed by pressure in the bellows 166, the force of the adjustable spring 167, and the buoyant force developed when the displacers are immersed in liquid.

In operation, when the liquid level in a storage tank drops to a level which affects the buoyancy of the lower displacer 169 as shown in Fig. 10, the combined effective weight of the displacers rotates the lever 163 in a clockwise direction against the expansive force of the spring 167 permitting the supply and waste valve 162 to admit supply pressure to the signal input pipe $1^1$ and to the bellows 166. The added force of the bellows 166 also opposes the spring 167 to snap the supply and waste valve 162 to its maximum output loading position. When the liquid level rises to the position shown in Fig. 11, wherein the effective weight of the upper displacer 168 is decreased, the resulting buoyant force together with the force of the spring 167 is sufficient to overcome the force developed by the pressure in the bellows 166, thereby rotating the lever 163 counterclockwise and moving the supply and waste valve 162 to begin to exhaust the pressure in the signal input pipe $1^1$ and bellows 166. The reduction of pressure in the bellows 166 snaps the supply and waste valve to its maximum exhaust position. Intermediate changes in liquid level do not change the buoyancy of either displacer and thus do not develop sufficient change in force to overcome that change in force occurring at the bellows.

In a typical application illustrated in Fig. 1, wherein the device is applied to the sequential control of the filling of a battery of storage tanks of which tank stations number I, II and III are representative, the signal input pipes $1^1$, $2^1$ and $3^1$ and the output pipes 1, 2 and 3 are connected with the level transmitters 21 and fill valves 22, respectively, of the corresponding stations. As herein illustrated, tanks in stations I and III are substantially empty and the tank in station II is substantially full. When the sequential selector is connected with station I, it receives a high pressure signal from the level transmitter indicating an empty tank. The high pressure signal causes the sequential selector to dwell at that station and to transmit supply pressure through pipe 1 to the diaphragm chamber 175 of the fill valve 22, whereby the valve is opened as shown in Fig. 10 and liquid is admitted to the tank. When the tank becomes filled, a low pressure signal is transmitted by the level transmitter to the sequential selector which is then advanced to the next position wherein it receives an incoming signal from station number II through the pipe $2^1$. The port 144 associated with pipe 1 is now open to atmosphere reducing the pressure in pipe 1 to zero p. s. i. and permitting the fill valve 22 to close as shown in Fig. 11. Since the tank in station number II is full, the resulting low pressure signal in pipe number $2^1$, transmitted by the level transmitter, causes the pilot to immediately advance the selector to the next station so that pipes 3 and $3^1$, associated with station number III, are connected with common ports 142 and 151 of the selector valve. Although the supply pressure is connected momentarily to pipe 2, the pause at station number II is so brief that the volume of supply pressure transmitted to the fill valve is insufficient to open it. Since the tank at station number III is substantially empty, a high pressure signal is transmitted by the level transmitter through pipe number $3^1$ which holds the selector at that station, and therefore supply pressure is conducted through the output portion of the selector valve and through pipe 3 to open the fill valve associated with that station. When the tank at station number III becomes full, the selector valve is advanced by the action described in stepwise fashion until a port bearing a high pressure signal, indicative of an empty tank, is encountered.

The device embodying this invention, as hereinabove described, is adapted for the control of 12 tank stations, but if less than 12 stations are present, the unused signal ports may be left open to atmosphere. The resulting low pressure signal encountered by the selector valve at each of the unused ports is identical to that received from a full tank, and an immediate stepwise advance occurs.

If it is desired to have the selector valve advance on a high pressure signal and dwell on a low pressure signal, the connections to the slide valve ports may be changed as shown in Fig. 9. The center port 100 of the slide valve 35 remains connected to the pilot 36, but the connection to the port 99, indicated at $99^1$, has been changed from the supply pipe 104 to the common port 151 of the input portion of the selector valve. The lower port 101, indicated at $101^1$, which had been connected to the common port 151 of the input portion of the selector valve, is now open to atmosphere.

The operation of the device as shown in Fig. 9 is as follows:

Assuming that a low pressure input signal is present and is received through the common port 151 of the input portion of the selector valve, with the slide valve block 94 at the position shown in Fig. 9, the low pressure signal is connected through the ports $99^1$ and 100 and the pipe 105 to the pilot, shown for example in Fig. 10. The low pressure signal to the pilot results in the pilot output pressure being equal to that of the supply, said output pressure being applied to the actuator pressure chamber 62, thereby holding the piston 64 in its lowermost position as shown in Fig. 8. When the input signal changes to a high pressure signal and is applied to the pilot in the manner described, the pilot output pressure is exhausted to zero p. s. i. and the spring 67 moves the piston 64 of the actuator to its uppermost position as shown in Fig. 10. The ratchet arm 73 is rotated clockwise and the pawl 78 engages the next ratchet tooth 80 on the rotor. As the ratchet arm 73 approaches the end of its clockwise rotation, the slide valve actuator arm 82 engages the pin 102 and moves the slide valve block 94 downwardly so that the center port 100 is now connected to the lower port $101^1$ which is open to atmosphere. When this occurs, the control chamber 106 of the pilot, which had been subjected to the high input signal pressure, is vented to atmosphere. This causes the pilot output pressure to increase to that of supply pressure and through its action on the actuator piston 64, rotates the ratchet arm 73 counterclockwise, thereby advancing the selector valve rotor 43 to the next set of ports and returning the slide valve block 94 to its original position.

While I have shown and described the device embodying this invention as applied to the control of the filling of a battery of storage tanks, it is adapted for any application wherein the automatic sequential selection of the source and destination of appropriate pneumatic signals is desired. The device may also be readily adapted to select signal destinations only in response to one source of input signal by connecting the input signal to all the pipes $1^1$–$12^1$.

Having thus described my invention, what I claim as new therein and desire to secure by Letters Patent of the United States is:

1. In a sequential selector having a pair of common ports and a plurality of pairs of input and output ports, a source of operating pressure connected with one of the pair of common ports and a device responsive to pneumatic pressure connected to the output port of each pair of input and output ports, a source of input signal pressure connected to the input port of each pair of input and output ports, the other of said pair of common ports being connected to a means for generating pulsating pressure, said means having a source of operating pressure and initiating pneumatic pressure pulsations in response to an input pressure signal of one selected value and terminating said pressure pulsations in response to an input pressure signal of another selected value, and a movable valve member actuated by said means to sequentially connect one of the pair of common ports to each output port of the plurality of pairs of input and output ports, and to sequentially connect the other common port of the pair of common ports to each input port of the plurality of pairs of input and output ports, whereby each source of input pressure signal is sequentially connected to said means and the corresponding device responsive to pneumatic pressure is connected to said source of operating pressure.

2. In a sequential selector having at least one common port and a plurality of output ports, a source of operating pressure connected to the common port and a device responsive to pneumatic pressure connected to each of the output ports, means for initiating pneumatic pressure pulsations in response to an input pressure signal of one selected value and for terminating said pressure pulsations when the input pressure signal changes to another selected value, said means including a three-way valve, an actuator in operative connection with said three-way valve, and a pilot relay governed by said three-way valve and in operative connection with said actuator, said three-way valve, having a source of fixed pressure equal to the selected value of the input pressure signal at which pulsations terminate, adapted to connect the pilot relay to the source of input pressure signal when the said pressure pulsations terminate and to periodically connect said pilot relay to said source of fixed pressure when pulsations occur, and a movable valve member positioned by said actuator to sequentially connect the said common port to each of the said output ports.

3. In a sequential selector having a pair of common ports comprising an input common port and an output common port and having a plurality of pairs of input and output ports, a source of operating pressure connected with the output common port and a device responsive to pneumatic pressure connected to the output port of each pair of input and output ports, a source of input signal pressure connected to the input port of each pair of input and output ports, the input common port being connected to a means having a source of operating pressure and initiating pneumatic pressure pulsations in response to an input pressure signal of one selected value and terminating said pressure pulsations in response to an input pressure signal of another selected value, said means including a three-way valve, an actuator in operative connection with said three-way valve, and a pilot relay governed by said three-way valve and in operative connection with said actuator, said three-way valve, having a source of fixed pressure equal to the selected value of the input pressure signal at which pulsations terminate, adapted to connect the pilot relay to the common input port when the said pressure pulsations terminate and to periodically connect said pilot relay to said source of fixed pressure when pulsations occur, and a movable valve member positioned by said actuator to sequentially connect the said output common port to each of the output ports of said pair of input and output ports and to simultaneously connect the said input common port to the corresponding input port of the pairs of input and output ports, whereby each source of input pressure signal is sequentially connected to said means and the corresponding device responsive to pneumatic pressure is connected to said source of operating pressure.

4. A sequential selector according to claim 3, wherein the pilot relay is of the snap-acting type to provide constant amplitude pressure pulsations to the actuator.

5. A sequential selector according to claim 4, wherein the pilot relay is of the reverse snap-acting type.

6. In a sequential selector having a pair of common ports and a plurality of pairs of input and output ports, a source of operating pressure connected with one of the pair of common ports and a device responsive to pneumatic pressure connected to the output port of each pair of input and output ports, a source of input signal pressure connected to the input port of each pair of input and output ports, the other of said pair of common ports being connected to a means for generating pulsating pressure, said means having a source of operating pressure and initiating pneumatic pressure pulsations in response to an input pressure signal of a selected low value and terminating said pressure pulsations in response to an input pressure signal of a selected high value, and a movable valve member actuated by said means to sequentially connect one of the pair of common ports to each output port of the plurality of pairs of input and output ports, and to sequentially connect the other common port of the pair of common ports to each input port of the plurality of pairs of input and output ports, whereby the movable valve member advances when a low pressure signal is encountered and dwells when a high pressure signal is encountered.

7. In a sequential selector having a pair of common ports and a plurality of pairs of input and output ports, a source of operating pressure connected with one of the pair of common ports and a device responsive to pneumatic pressure connected to the output port of each pair of input and output ports, a source of input signal pressure connected to the input port of each pair of input and output ports, the other of said pair of common ports being connected to a means for generating pulsating pressure, said means having a source of operating pressure and initiating pneumatic pressure pulsations in response to an input signal of a selected high value and to terminate said pressure pulsations in response to an input signal of a selected low value, and a movable valve member actuated by said means to sequentially connect one of the pair of common ports to each output port of the plurality of pairs of input and output ports, and to sequentially connect the other common port of the pair of common ports to each input port of the plurality of pairs of input and output ports, whereby the movable valve member advances when a high pressure signal is encountered and dwells when a low pressure signal is encountered.

References Cited in the file of this patent

UNITED STATES PATENTS

| | | |
|---|---|---|
| 2,059,126 | Malthaner | Oct. 27, 1936 |
| 2,742,918 | Irving | Apr. 24, 1956 |
| 2,779,348 | Robertson | Jan. 29, 1957 |